United States Patent
Wu

(10) Patent No.: US 8,045,452 B2
(45) Date of Patent: Oct. 25, 2011

(54) METHOD FOR HANDLING FAULT BETWEEN AN EGRESS LABEL SWITCHING ROUTER AND A DATA DEVICE CONNECTED THEREWITH

(75) Inventor: Jian Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 503 days.

(21) Appl. No.: 11/527,846

(22) Filed: Sep. 27, 2006

(65) Prior Publication Data

US 2007/0076720 A1    Apr. 5, 2007

Related U.S. Application Data

(63) Continuation of application No. PCT/CN2005/001583, filed on Sep. 28, 2005.

(30) Foreign Application Priority Data

Sep. 30, 2004    (CN) .......................... 2004 1 0081073

(51) Int. Cl.
*G01R 31/08*    (2006.01)
(52) U.S. Cl. .................. 370/228; 370/237; 370/395.5
(58) Field of Classification Search .............. 370/238, 370/216
See application file for complete search history.

(56) References Cited

U.S. PATENT DOCUMENTS

| | | | |
|---|---|---|---|
| 5,996,021 A * | 11/1999 | Civanlar et al. ............... | 709/238 |
| 6,208,616 B1 | 3/2001 | Mahalingam et al. ......... | 370/216 |
| 6,528,991 B2 * | 3/2003 | Ashe ........................ | 324/207.17 |
| 6,904,018 B2 * | 6/2005 | Lee et al. ...................... | 370/238 |
| 7,296,177 B2 * | 11/2007 | Johansson et al. ................ | 714/4 |
| 2002/0060985 A1 | 5/2002 | Lee et al. | |
| 2004/0071080 A1 * | 4/2004 | Uchiyama et al. ............ | 370/225 |
| 2004/0095612 A1 * | 5/2004 | Eguchi et al. ................ | 358/402 |
| 2004/0174887 A1 * | 9/2004 | Lee .......................... | 370/395.53 |

FOREIGN PATENT DOCUMENTS

| | | |
|---|---|---|
| CN | 1514585 | 7/2004 |
| EP | 1 320 219 | 6/2003 |
| EP | 1 422 870 | 5/2004 |
| JP | 2003/179628 | 6/2003 |
| JP | 2003/338831 | 11/2003 |

OTHER PUBLICATIONS

Liu, C.J, QoS Transparency for Native IP Networks, Digital Object Identifier 10.1109/ICNS.2006.91, Jul. 16-18, 2006, 5 pages.*
Supplemental European Search Report for Application No. 05791905.2-2415, dated Aug. 29, 2007.
International Search Report for PCT/CN2005/001583, mailed Dec. 8, 2005.

* cited by examiner

*Primary Examiner* — Ayaz R Sheikh
*Assistant Examiner* — Mounir Moutaouakil
(74) *Attorney, Agent, or Firm* — Marshall, Gerstein & Borun LLP

(57) ABSTRACT

Disclosed is a method for handling fault between an Egress LSR and an Egress data device connected with it, including the following steps: an Egress Label Switching Router (LSR) transmitting fault information to an Ingress LSR after detecting a fault of an Egress Work link connected with it; the Ingress LSR adjusting a service flow transmission according to the received fault information. When there exists an Egress Protect link in the network, the present invention can transmit the service flow through the Egress Protect link, thus it is guaranteed that the service flow can be transmitted to the Egress data device; and the service flow is not transmitted when there is no Egress Protect link in the network, thus the waste of network resources is avoided.

17 Claims, 6 Drawing Sheets

METHOD FOR HANDLING FAULT BETWEEN AN EGRESS LABEL SWITCHING ROUTER AND A DATA DEVICE CONNECTED THEREWITH

CROSS-REFERENCES TO RELATED APPLICATIONS

This is a continuation of International Application No. PCT/CN2005/001583, which was filed on Sep. 28, 2005, and which, in turn, claimed the benefit of Chinese Patent Application No. 200410081073.4, which was filed on Sep. 30, 2004, the entire disclosures of which are hereby incorporated herein by reference.

BACKGROUND OF THE DISCLOSURE

1. Field of the Technology

The present invention relates to network transmission techniques using Multi-Protocol Label Switching (MPLS), more particularly to a method for handling a fault between an Egress Label Switching Router (Egress LSR) and a data device connected with it.

2. Background of the Invention

Currently, the MPLS has become a key technique for multi-service bearers in an Internet Protocol (IP) network. Accordingly, fault detection and protection switching technique for the MPLS becomes an important factor that impacts the normal operation of the IP network. Corresponding standards for implementing the fault detection and the protection switching technique for MPLS networks defined by International Telecommunication Union-Telecommunication sector (ITU-T) are shown in Table 1.

| Protocol Numbers | Titles |
| --- | --- |
| Y.1710 | Requirements for Operation And Maintenance (OAM) functionality for MPLS networks |
| Y.1711 | OAM mechanism for MPLS networks |
| Y.1720 | Protection switching for MPLS networks |

Referring to Table 1, the standard Y.1711 defines an end-to-end fault detection mechanism for the MPLS networks, namely the Operation and Maintenance (OAM) fault detection mechanism. The standard Y.1720 defines an end-to-end protection switching mechanism for the MPLS networks. The end-to-end mentioned here refers to from an Ingress Label Switching Router (Ingress LSR) to an Egress LSR that both adopt the MPLS technique.

According to the standards Y.1711 and Y.1720, if a Work Label Switching Path (Work LSP) between an Ingress LSR and an Egress LSR is failed, the Egress LSR sends a Backward Defect Indication (BDI) packet to the Ingress LSR. After receiving the BDI packet, the Ingress LSR operates the corresponding protection switching process.

SUMMARY OF THE INVENTION

The present invention provides a method for handling fault between an Egress Label Switching Router (LSR) and a data device connected with it, so as to perform protection switching process towards the fault of the data device or a link connected with the Egress LSR.

One of the technical solutions of the present invention is implemented as follows. A method for handling fault between an Egress LSR and a data device connected with it includes the following steps: transmitting, by an Egress LSR, fault information to an Ingress LSR after detecting a fault of an Egress Work link connected with it; adjusting, by the Ingress LSR, a service flow transmission according to the received fault information.

It can be seen that, when the Work LSP is not failed but the link or the data device connected with the Egress LSR is failed, the Egress LSR sends fault information to the Ingress LSR, which leads the Ingress LSR to learn the current fault and perform the protection switching process towards the fault, thus it is guaranteed that the service flow is transmitted to the data device connected with the Egress LSR through the Protect path.

When there is no Protect path in the network structure which uses the MPLS technique to transmit the service flow, the fault information of the link or the data device connected with the Egress LSR in the Egress direction can be transmitted to the Ingress LSR. After learning the fault, the Ingress LSR forbids sending the service flow to the data device connected with the Egress LSR, which avoids some disadvantages, such as, since the fault can not be learned, the access data device and the Ingress LSR continually send the service flow which is impossible to be transmitted to the data device connected with the Egress LSR. Thereby the waste of network resources is avoided.

DETAILED DESCRIPTION OF PREFERRED EMBODIMENTS

In order to make the technical solutions and advantages of the present invention clearer, an implementation of an end-to-end fault detection and protection switching will be described first hereinafter with reference to accompanying drawings.

Figure 1:
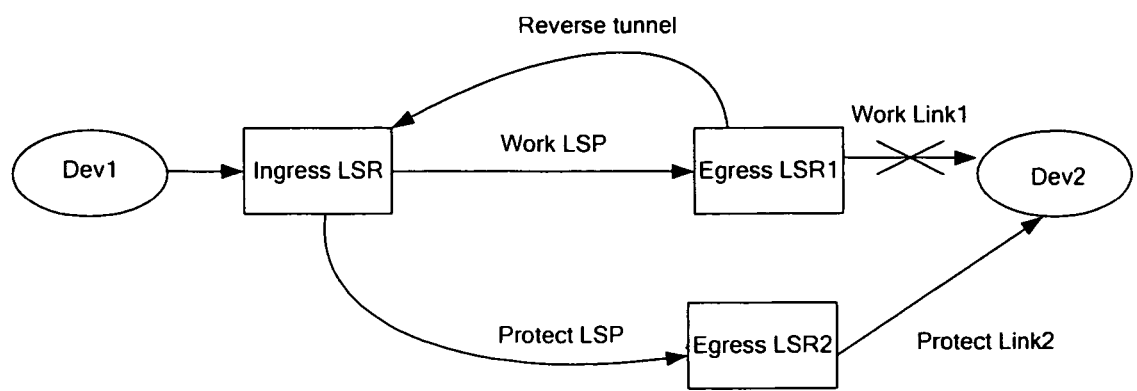
FIG. 1 is a schematic diagram illustrating a network structure using the MPLS technique to transmit a service flow.
Figure 2:
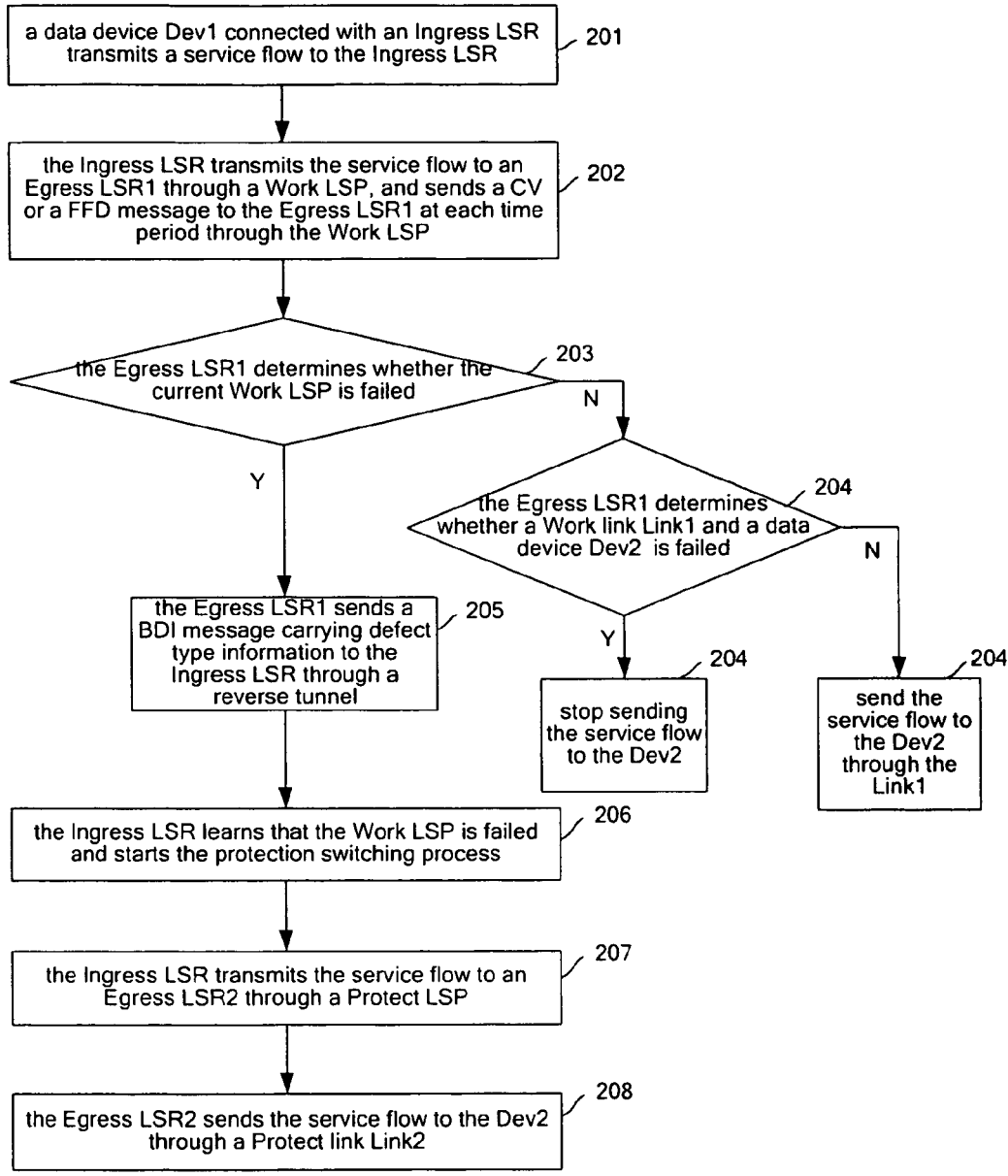
FIG. 2 is a flow chart illustrating an implementation of an end-to-end fault detection and protection switching of the MPLS according to the related art.

FIG. 1 is a schematic diagram illustrating a network structure using the MPLS technique to transmit a service flow. FIG. 2 is a flow chart illustrating an implementation of an end-to-end fault detection and protection switching for the MPLS according to the related art. With reference to the network structure as shown in FIG. 1, when the service flow is transmitted by the MPLS technique, the detailed process of the end-to-end fault detection and protection switching for the MPLS according to the related art is shown in FIG. 2, including the following steps:

Step 201: A data device Dev1 connected with an Ingress LSR in an Ingress direction transmits a service flow to the Ingress LSR.

Step 202: The Ingress LSR transmits the service flow to an Egress LSR1 through a Work LSP, and sends a Connectivity Verification (CV) packet or a Fast Fault Detection (FFD) packet to the Egress LSR1 at each time period through the Work LSP.

Wherein, if it is a CV packet that is sent, the period is one second; if it is an FFD packet that is sent, the period is 50 ms.

Step 203: The Egress LSR1 receives the service flow and the CV or the FFD packet sent by the Ingress LSR, and determines whether the current Work LSP is failed or not according to the CV or the FFD packet, if the current Work LSP is failed, execute Step 205, otherwise, execute Step 204.

Wherein, the Egress LSR1 determines that the Work LSP is failed in the following circumstances: a bottom-layer transmission line fault; the CV or the FFD packet is not received within three consecutive periods; three CV or the FFD packets carrying an unknown Trail Termination Source Identifier (TTSI) have been received within three consecutive periods; the CV or the FFD packets carrying legal TTSIs as well as the CV or the FFD packets carrying unknown TTSIs are received within three consecutive periods; five or more than five CV or FFD packets carrying legal TTSIs are received within three consecutive periods; other unknown errors.

Step 204: The Egress LSR1 determines whether a Work link Link1 and a data device Dev2 connected with it in an Egress direction is failed or not, if they are failed, stop sending the service flow to the Dev2 and end the current service flow transmission; otherwise, send the service flow to the Dev2 through the Link1, then end the current service flow transmission.

Step 205: The Egress LSR1 sends a BDI packet carrying defect type information to the Ingress LSR through a reverse tunnel to inform the Ingress LSR of the fault of the Work LSP.

Wherein, supposing the fault determined by the Egress LSR1 in Step 203 is that the CV or the FFD packet is not received within three consecutive periods, then in this step, the defect type information carried by the BDI packet is a defect code 0201 identifying this fault.

Step 206: After receiving the BDI packet, the Ingress LSR learns that the Work LSP is failed and starts the protection switching process.

Step 207: The Ingress LSR transmits the service flow sent by the Dev1 to an Egress LSR2 through a Protect LSP.

Step 208: The Egress LSR2 sends the service flow to the Dev2 through a Protect link Link2.

It can be seen from the above flows, if the Work LSP between the Ingress LSR and the Egress LSR is failed, no matter whether the link between the Egress LSR and the data device connected with it or the data device is failed or not, the service flow can be transmitted to the data device through the protection switching process of the MPLS technique.

In the related art, however, the Egress LSR sends the BDI packet to the Ingress LSR only when the Work LSP is failed. Accordingly, the Ingress LSR performs the corresponding protection switching process only after receiving the BDI packet.

Therefore, when it is impossible to transmit or receive the data flow due to the fault of the link or the data device connected with the Egress LSR instead of the fault of the Work LSP, the Egress LSR does not send the BDI packet to the Ingress LSR. Since the Ingress LSR does not receive the BDI packet, it will not realize the fault, thereby it will not perform any protection switching process towards the fault, and the service flow transmission to the data device connected with the Egress LSR cannot be guaranteed. In addition, as the Ingress LSR can not know the fault of the link or data device connected with the Egress LSR, the data device connected with the Ingress LSR and the Ingress LSR still continuously sends the service flow to the Egress LSR through the Work LSP, which leads to a waste of the network resources and bandwidth.

In view of above, a method for handling fault between an Egress LSR and a data device connected with it is provided; the present invention will be described in detail with reference to the accompanying drawings and the embodiments hereinafter.

The method of handling the fault between an Egress LSR and a data device connected with it according to the embodiments of the present invention includes: after the Egress LSR detects an Egress Work link connected with it is failed, it transmits fault information to the Ingress LSR; after receiving the fault information, the Ingress LSR adjusts the service flow transmission. Wherein, the Egress LSR can send the fault information in a packet.

For example, in the related art, after receiving a BDI packet carrying defect type information, the Ingress LSR learns that the Work LSP is failed and the fault type, then it performs a protection switching process. Therefore, identifier information used for indicating the fault of the Egress Work link can be configured in the BDI packet. Specifically, a defect definition indicating the fault of the link or the data device connected with the Egress LSR in the Egress direction can be added in the defect types carried by the BDI packet, therefore the fault information can be transmitted to the Ingress LSR through the BDI packet, thus triggering the Ingress LSR to perform the protection switching process towards the fault. Wherein, the format of the defect definition is as follows: a defect name, such as a remote link state DOWN; a defect code, such as 0301. The described defect name and defect code are only detailed examples. They can also be defined as other contents.

In addition, a Work link, which is connected with the Egress LSR in the Egress direction and used in normal transmission, is correlated with a Work LSP by a command on the Egress LSR, i.e., the Work link and the Work LSP are bound to form a complete transmission path. Thus when any one of the Work link and the Work LSP is failed, the Egress LSR will send the BDI packet to the Ingress LSR.

No matter whether the link or the data device connected with the Egress LSR is failed, the fault detected by the Egress LSR is expressed as the fault of the link connected with it. Therefore, the following mentioned fault of the link connected with the Egress LSR hereinafter includes fault of the link and the fault of the data device.

As the service flow transmission using the MPLS technique can be applied into multiple network structures, when the Work LSP is normal, the protection switching process towards the fault between the Egress LSR and the data device connected with it will be described hereinafter with reference to several common network structures.

Figure 3:
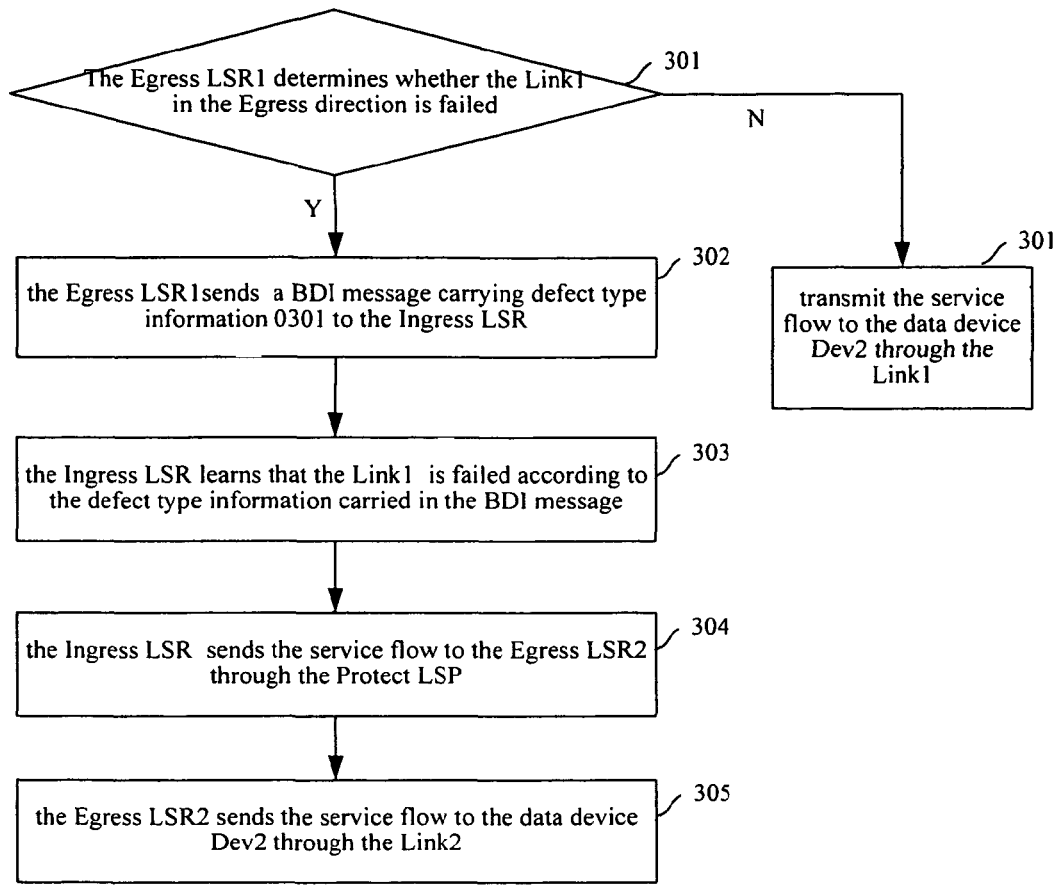
FIG. 3 is a flow chart illustrating a process of handling a fault between the Egress LSR and the data device connected with it according to the network structure shown in FIG. 1.

As shown in FIG. 1, when the service flow is transmitted using the network structure as shown in FIG. 1, a normal service flow transmission path includes the Work LSP, the Egress LSR1 and the Work link Link1. A Protect transmission path includes the Protect LSP, the Egress LSR2 and the Protect link Link2. FIG. 3 is a flow chart illustrating a process of handling the fault between the Egress LSR and the data device connected with it according to the network structure shown in FIG. 1. As shown in FIG. 1 and FIG. 3, the process of handling the fault between the Egress LSR and the data device connected with it includes the following steps:

Step 301: After receiving a service flow sent from the Ingress LSR through the Work LSP, the Egress LSR1 determines whether the Link1 is failed or not, if it is failed, execute Step 302, otherwise, transmit the service flow to the data device Dev2 through the Link1, and end the current procedure.

Step 302: The Egress LSR1 constructs a BDI packet carrying defect type information 0301, sends the BDI packet to the Ingress LSR through a reverse tunnel. Wherein, the defect type information 0301 indicates a remote link state DOWN information.

Step 303: After receiving the BDI packet, the Ingress LSR learns that the Link1 correlated with the Work LSP is failed according to the defect type information 0301 carried in the BDI packet.

Step 304: Tthe Ingress LSR performs the protection switching process, and sends the service flow to the Egress LSR2 through the Protect LSP.

Step 305: After receiving the service flow, the Egress LSR2 sends the service flow to the data device Dev2 through the Link2.

Figure 4:
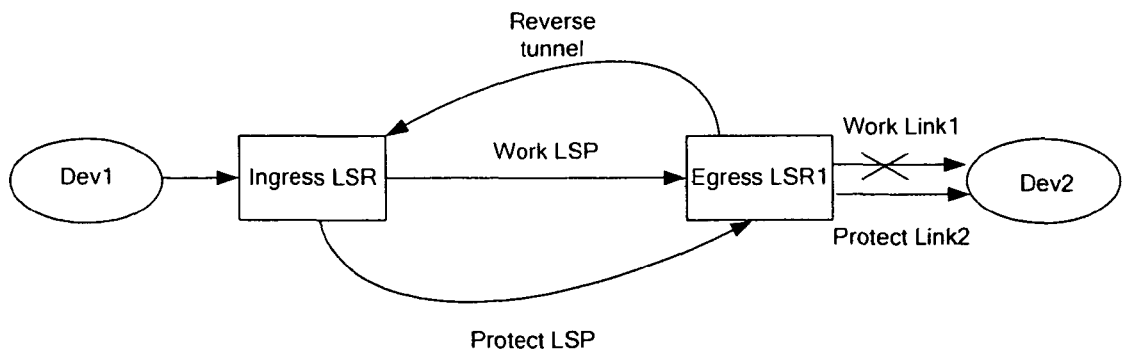
FIG. 4 is a schematic diagram illustrating a second network structure using the MPLS technique to transmit a service flow.
Figure 5:
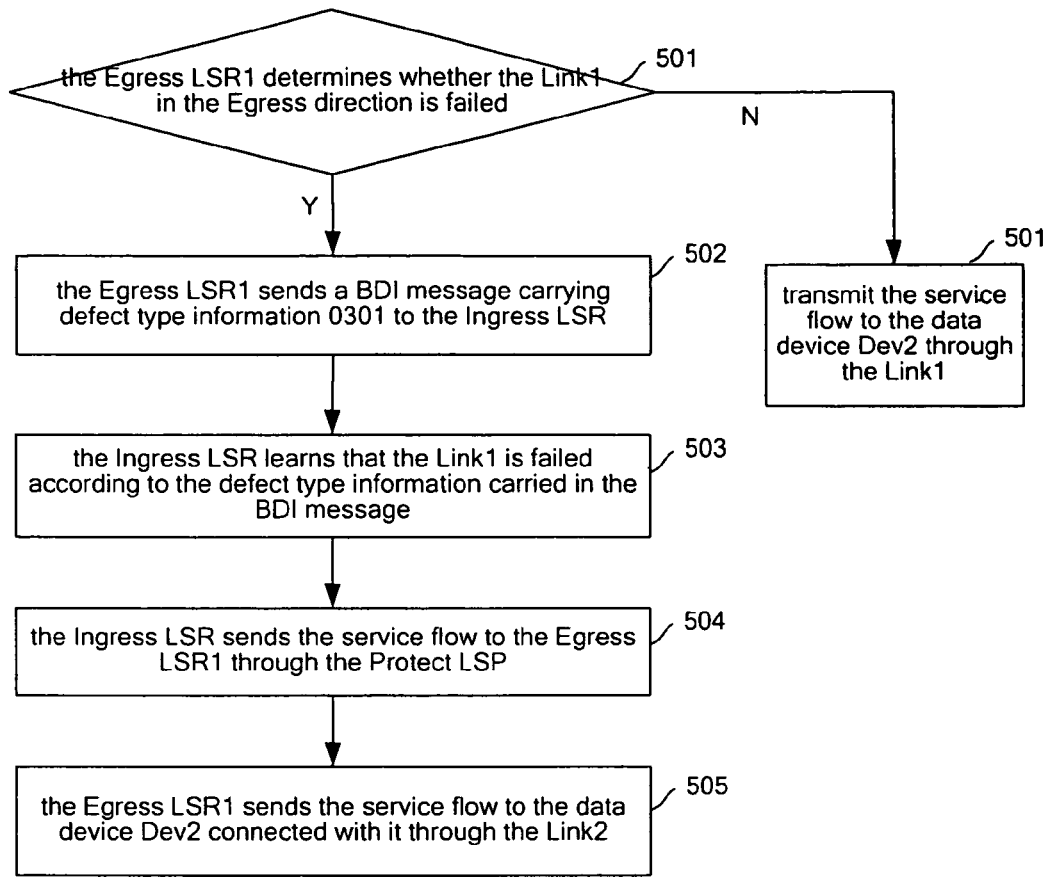
FIG. 5 is a flow chart illustrating a process of handling a fault between the Egress LSR and the data device connected with it according to the second network structure.

FIG. 4 is a schematic diagram illustrating a second network structure using the MPLS technique to transmit a service flow. When the service flow is transmitted using the network structure shown in FIG. 4, if the network adopts a 1:1 protection switching mechanism, i.e., the service flow is only sent by the Work LSP in a the normal transmission, the process of handling the fault between the Egress LSR and the data device connected with it is shown in FIG. 5. As shown in FIG. 5, the process includes the following steps:

Steps 501-503 are the same as Steps 301-303.

Step 504: The Ingress LSR sends the service flow to the Egress LSR1 through the Protect LSP.

Step 505: After receiving the service flow from the Protect LSP, the Egress LSR1 sends the service flow to the data device Dev2 connected with it through the Link2.

When the service flow is transmitted using the network structure shown in FIG. 4, if the network adopts a 1+1 protection switching mechanism, i.e., the service flow is sent by the Work LSP and the Protect LSP simultaneously in the normal transmission, the process of handling the fault between the Egress LSR and the data device connected with it is almost the same as that shown in FIG. 5. One difference is that, in Step 502 the Egress LSR1 configures a reception switch for the service flow, i.e., configures to receive the service flow through the Protect LSP, then constructs and sends the BDI packet. And the other difference is that, in Step 503, the Ingress LSR further needs to configure a transmission switch for the service flow, i.e., configure to transmit the service flow through the Protect LSP. The other steps are the same as those shown in FIG. 5.

Figure 6:
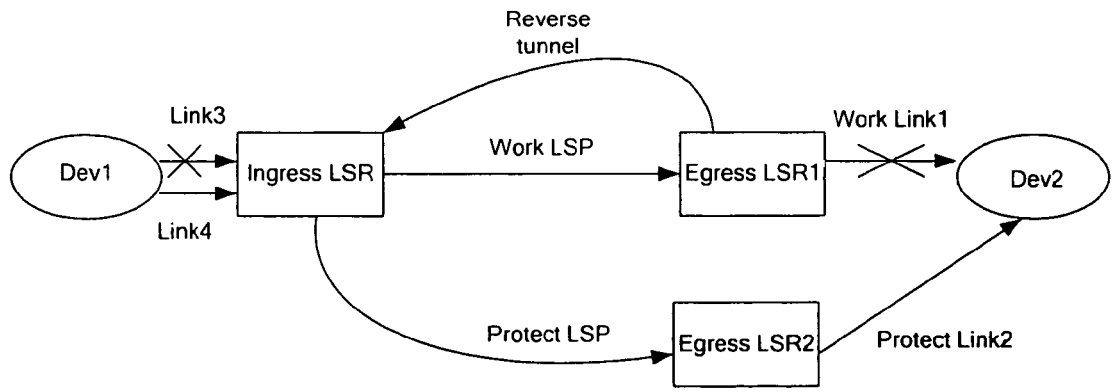
FIG. 6 is a schematic diagram illustrating a third network structure using the MPLS technique to transmit a service flow.

FIG. 6 is a schematic diagram illustrating a third network structure using the MPLS technique to transmit a service flow. There are two sets of transmission paths for the service flow in the network structure shown in FIG. 6. When the transmission is normal, the service flow is transmitted through a Work link Link3, the Work LSP, the Egress LSR1 and the Link1; when the protection switching is performed towards the fault, the service flow is transmitted through a Protect link Link4, the Protect LSP, the Egress LSR2 and the Link2.

Figure 7:
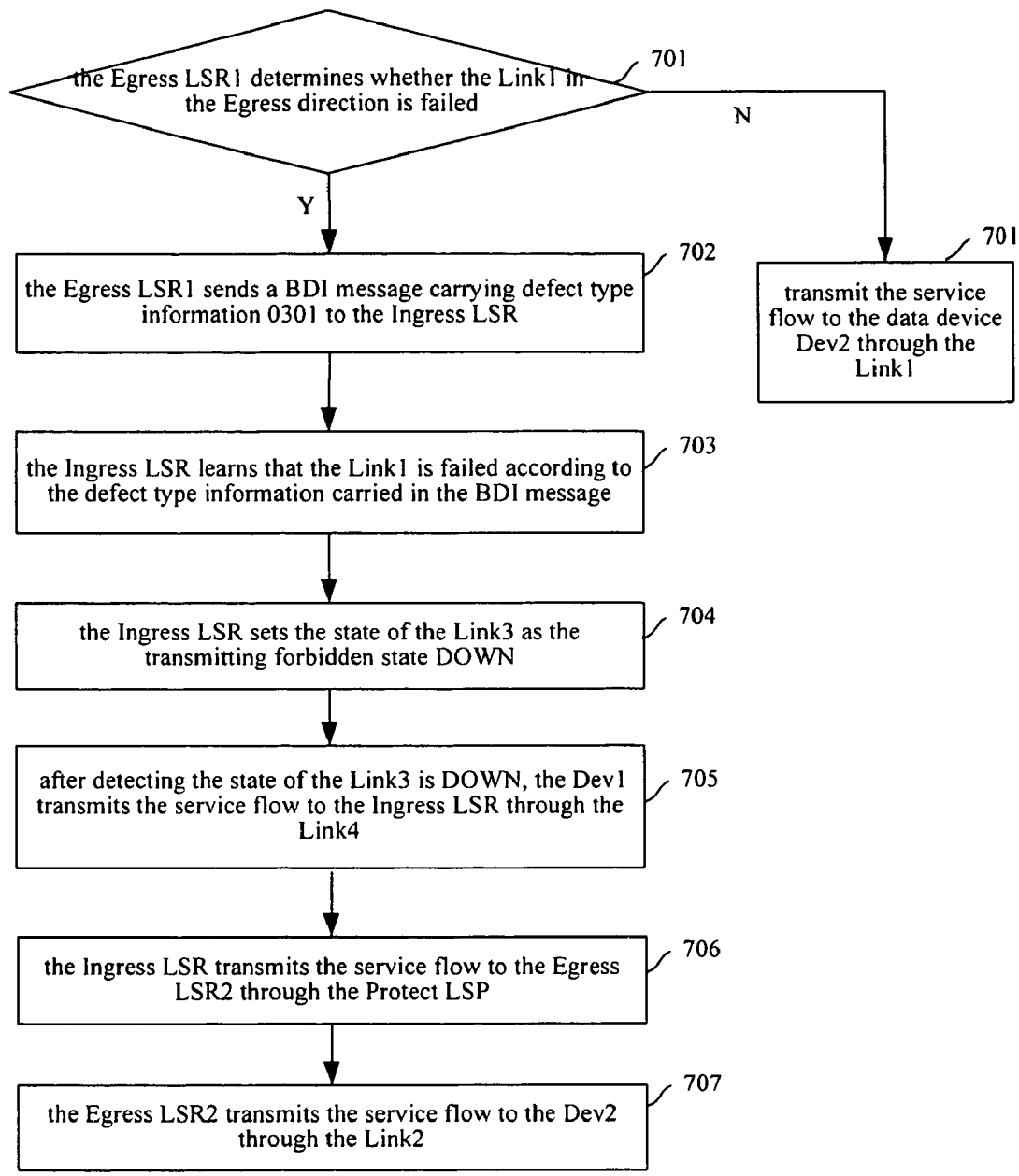
FIG. 7 is a flow chart illustrating a process of handling a fault between the Egress LSR and the data device connected with it according to the third network structure.

FIG. 7 is a flow chart illustrating a process of handling the fault between the Egress LSR and the data device connected with it according to the third network structure. As shown in FIG. 6 and FIG. 7, the process of handling the fault between the Egress LSR and the data device connected with it according to the third network structure shown in FIG. 6 includes the following steps:

Steps 701-703 are the same as the Steps 301-303.

Step 704: The Ingress LSR sets the state of the Link3 as the transmission forbidden state DOWN.

Step 705: After detecting the state of the Link3 is DOWN, the Dev1 transmits the service flow to the Ingress LSR through the Link4.

Step 706: After receiving the service flow from the Link4, the Ingress LSR transmits the service flow to the Egress LSR2 through the Protect LSP.

Step 707: The Egress LSR2 transmits the service flow to the Dev2 through the Link2.

The Protect transmission paths are existent in all of the above network structures shown in FIG. 1, FIG. 4 and FIG. 6. Accordingly, the procedures shown in FIG. 3, FIG. 5 and FIG. 7 are all processed of handling the fault when there is a Protect transmission path in the network. The process of handling the fault when there is no Protect transmission path is described hereinafter.

Figure 8:
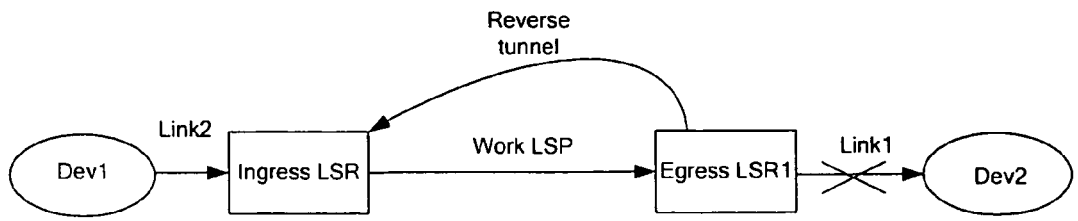
FIG. 8 is a schematic diagram illustrating a fourth network structure using the MPLS technique to transmit a service flow.
Figure 9:
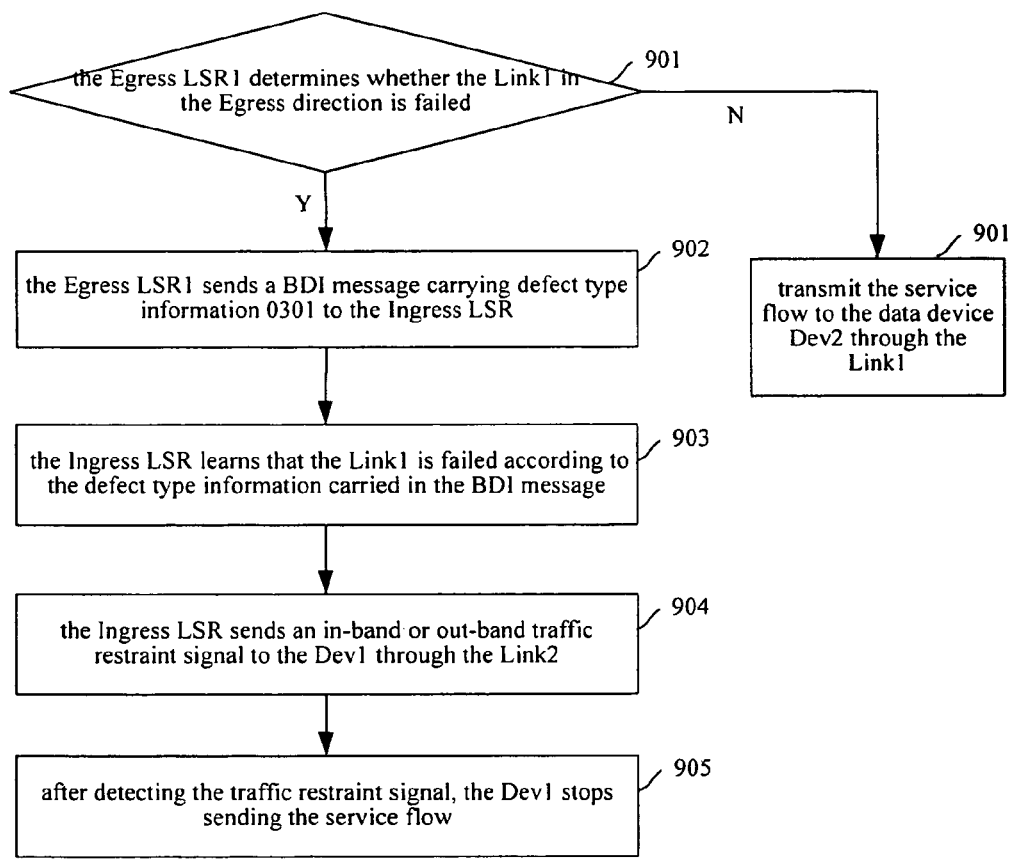
FIG. 9 is a flow chart illustrating a process of handling a fault between the Egress LSR and the data device connected with it according to the fourth network structure.

FIG. 8 is a schematic diagram illustrating a fourth network structure using the MPLS technique to transmit a service flow. Only a Work LSP for the service flow transmission is existent in the structure shown in FIG. 8, and the Egress LSR1 connects with the Dev2 only through one link, i.e., there exists no Protect transmission path in the network. FIG. 9 is a flow chart illustrating a process of handling the fault between the Egress LSR and the data device connected with it according to the fourth network structure. As shown in FIG. 8 and FIG. 9, the step of handling the fault between the Egress LSR and the data device connected with it according to the fourth network structure without the Protect transmission path shown in FIG. 8 includes the following steps:

Steps 901-903 are the same as the Steps 301-303.

Step 904: The Ingress LSR sends an in-band or out-band traffic restraint signal to the Dev1 through the Link2 connected with it in the Ingress direction.

Step 905: After detecting the traffic restraint signal, the Dev1 stops sending the service flow.

Wherein, the process from Step 904 to Step 905 also can be: the Ingress LSR sets the state of the Link2 connected with it in the Ingress direction as DOWN; after detecting the state of the Link2 is DOWN, the Dev1 stops sending the service flow to the Ingress LSR.

As the Protect LSP and Protect link are not existent in the network structure shown in FIG. 8, when the link connected with the Egress LSR is failed, the Egress LSR informs the Ingress LSR of the fault as shown in FIG. 9, thus the Ingress LSR can adopt corresponding measures to prevent the access data device from sending data to the Ingress LSR, thereby the meaningless resources waste is avoided.

To sum up, the above-mentioned embodiments are only the preferred embodiments of the present invention and are not use for limit the protection scope of the present invention. Any modification, equivalent replacement or improvement made without departing from the spirit and principles of the present invention is covered in the protection scope of the claims of the present invention.

What is claimed is:

1. A method for handling a fault between an Egress Label Switching Router (LSR) and a data device connected with the Egress LSR, comprising:

binding, by the Egress LSR, an Egress Work link between the Egress LSR and the data device connected with the Egress LSR and a Work Label Switching Path (LSP) between an Ingress LSR and the Egress LSR into one link;

transmitting, by the Egress LSR, fault information to the ingress LSR after detecting a fault of the Egress Work link between the Egress LSR and the data device connected with the Egress LSR; and adjusting, by the Ingress LSR, a service flow transmission from the Ingress LSR to the data device according to the received fault information, wherein an Egress Protect link is existent between the Egress LSR and the Egress data device connected with the Egress LSR, wherein adjusting the service flow transmission by the Ingress LSR comprises, the Ingress LSR transmitting the service flow to the Egress LSR, and the Egress LSR transmitting the service flow to the data device through the Egress Protect link, wherein a Protect LSP is existent between the Ingress LSR and the Egress LSR, and wherein for transmitting the service flow to the Egress LSR by the Ingress LSR, the service flow is transmitted to the Egress LSR through the Protect LSP.

2. The method according to claim 1, wherein the fault information is transmitted in a Backward Defect Indication (BDI) packet.

3. The method according to claim 1, wherein the Egress LSR transmitting the fault information to the Ingress LSR is a Work Egress LSR;

wherein adjusting the service flow transmission according to the fault information by the Ingress LSR comprises:

the Ingress LSR transmitting the service flow to a Protect Egress LSR through a Protect LSP between the Ingress LSR and the Protect Egress LSR; and the Protect Egress LSR transmitting the service flow to the data device through an Egress Protect link between the Protect Egress LSR and the data device.

4. The method according to claim 3, wherein an Ingress Work link and an Ingress Protect link are existent between the Ingress LSR and an access data device connected with the Ingress LSR;

before transmitting the service flow to the Egress LSR by the Ingress LSR, the method further comprising:

the Ingress LSR setting the state of the Ingress Work link as a transmission forbidden state; and after detecting the transmission forbidden state of the Ingress Work link, the access data device transmitting the service flow to the Ingress LSR through the Ingress Protect link.

5. The method according to claim 1, wherein an Ingress Work link and an Ingress Protect fink are existent between the Ingress LSR and an access data device connected with the Ingress LSR;

before transmitting the service flow to the Egress LSR by the Ingress LSR, the method further comprising:

the Ingress LSR setting the state of the Ingress Work link as a transmission forbidden state; and after detecting the transmission forbidden state of the Ingress Work link, the access data device transmitting the service flow to the Ingress LSR through the Ingress Protect link.

6. The method according to claim 1, wherein, only the Egress Work link is existent between the Egress LSR and the Egress data device connected with the Egress LSR;

adjusting the service flow transmission by the Ingress LSR comprises forbidding an access data device to send the service flow to the Ingress LSR.

7. The method according to claim 6, wherein, adjusting the service flow transmission by the Ingress LSR specifically comprises:

sending, by the Ingress LSR, an in-band or out-band traffic restraint signal to the access data derive; and after detecting the traffic restraint signal, stopping sending, by the access data device, the service flow to the Ingress LSR.

8. The method according to claim 6, wherein the forbidding the access data device to send the service flow to the Ingress LSR comprises:

setting, by the Ingress LSR, the state of a link between an access data device and the Ingress LSR as a transmission forbidden state; and after detecting the transmission forbidden state of the link, the access data device stops sending the service flow to the Ingress LSR.

9. The method according to claim 1, wherein the fault information comprises identifier information indicating the fault of the Egress Work link;

wherein adjusting the service flow transmission according to the fault information by the Ingress LSR comprises the Ingress LSR adjusting the service flow transmission according to the identifier information.

10. A system for handling a fault between an Egress Label Switching Router (LSR) and a data device connected with the Egress LSR comprising:

the data device connected with the Egress LSR in an egress direction through an Egress Work link;

the Egress LSR configured to bind the Egress Work link and a Work LSP between an Ingress LSR and the Egress LSR into one link, transmit fault information to the Ingress LSR after detecting a fault of the Egress Work link, wherein the fault information is transmitted in a Backward Defect Indication (BDI) packet;

the Ingress LSR configured to adjust a service flow transmission from the ingress LSR to the data device according to the fault information received from the Egress LSR;

the Ingress LSR is further configured to transmit the service flow to the Egress LSR through a Protect LSP between the Ingress LSR and the Egress LSR;

the Egress LSR is further configured to transmit the service flow to the data device through an Egress Protect link between the Egress LSR and the data device;

a Protect Egress LSR connected with the data device through the Egress Protect link and connected with the Ingress LSR through the Protect LSP, the Protect Egress LSR configured to transmit the service flow to the data device through the Egress Protect link; and the Ingress LSR is further configured to transmit the service flow to the Protect Egress LSR through the Protect LSP after receiving the fault information.

11. The system according to claim 10, wherein the Egress LSR is further configured to set identifier information for indicating the fault of the Egress Work link in the fault information; and the Ingress LSR is further configured to adjust the service flow transmission according to the identifier information.

12. The system according to claim 10, further comprising:

an access data device connected with the Ingress LSR through an Ingress Work link and an Ingress Protect link, the access data device configured to transmit the service flow to the Ingress LSR through the Ingress Protect link after detecting a transmission forbidden state of the Ingress Work link; and the Ingress LSR is further configured to set the state of the Ingress Work link to the transmission forbidden state after receiving the fault information from the Egress LSR.

13. The system according to claim 10, further comprising:

an access data device connected with the Ingress LSR, and the access data configured to transmit the service flow to the Ingress LSR; and the Ingress LSR is further configured to forbid the access data device to send the service flow to the Ingress LSR.

14. The system according to claim 13, wherein the Ingress LSR is further configured to send an in-band or out-band traffic restraint signal to the access data derive; and the access data device is further configured to stop sending the service flow to the Ingress LSR after detecting the traffic restraint signal.

15. The system according to claim 13, wherein the Ingress LSR is further configured to set the state of a link between the access data device and the Ingress LSR as a transmission forbidden state; and the access data device is further configured to stop sending the service flow to the Ingress LSR after detecting the transmission forbidden state of the link.

16. An Egress Label Switching Router (LSR) apparatus for handling a fault between the Egress LSR apparatus and a data device connected with the Egress LSR in an egress direction, configured to implement a method comprising:

binding an Egress Work link between the Egress LSR apparatus and the data device connected with the Egress LSR apparatus and a Work Label Switching Path (LSP) between an Ingress LSR and the Egress LSR apparatus into one link;

transmitting fault information to the Ingress LSR after detecting a fault of the Egress Work link between the Egress LSR apparatus and the data device connected with the Egress LSR apparatus, wherein the Egress LSR apparatus is configured to transmit a service flow to the data device through an Egress Protect link between the Egress LSR apparatus and the data device; and a Protect Egress LSR connected with the data device through an Egress Protect link, and configured for connecting to an Ingress LSR through a Protect LSP, wherein the Protect Egress LSR configured to transmit the service flow to the data device through the Egress Protect link.

17. The apparatus according to claim 16, wherein the fault information is transmitted in a Backward Defect Indication (BDI) packet.

* * * * *

UNITED STATES PATENT AND TRADEMARK OFFICE
CERTIFICATE OF CORRECTION

PATENT NO.       : 8,045,452 B2  
APPLICATION NO.  : 11/527846  
DATED            : October 25, 2011  
INVENTOR(S)      : Jian Wu Page 1 of 1

It is certified that error appears in the above-identified patent and that said Letters Patent is hereby corrected as shown below:

At Column 8, line 50, "link" should be -- link, --.

Signed and Sealed this
Second Day of October, 2012

David J. Kappos
*Director of the United States Patent and Trademark Office*